US006074620A

United States Patent [19]
Kienow et al.

[11] Patent Number: 6,074,620
[45] Date of Patent: Jun. 13, 2000

[54] METHOD FOR THE CLEANING OF EXHAUST GAS AND PREVENTION OF EXPLOSIONS THEREIN

[75] Inventors: Ekkehard Kienow, Velbert; Bernd Morun, Essen; Thomas Schwertmann, Haan; Heinz Hoberg, Aachen, all of Germany

[73] Assignee: Rheinische Kalksteinwerke GmbH, Wülfrath, Germany

[21] Appl. No.: 08/318,915

[22] Filed: Oct. 5, 1994

Related U.S. Application Data

[63] Continuation-in-part of application No. PCT/EP94/00320, Feb. 4, 1994.

[30] Foreign Application Priority Data

Feb. 5, 1993 [DE] Germany .............................. 43 03 450

[51] Int. Cl.⁷ .................................................. B01J 8/00
[52] U.S. Cl. .............................. 423/244.07; 423/244.01; 423/244.08; 423/245.1
[58] Field of Search .......................... 423/239.1, 244.01, 423/244.07, 244.08, 245.1; 502/416, 417, 438

[56] References Cited

U.S. PATENT DOCUMENTS

| 4,372,927 | 2/1983 | McCullough ......................... 423/244 |
| 4,636,379 | 1/1987 | Bestek et al. . |
| 5,306,475 | 4/1994 | Fichtel et al. ......................... 423/210 |

FOREIGN PATENT DOCUMENTS

| 0479350 | 4/1992 | European Pat. Off. . |
| 2615828 | 10/1977 | Germany . |
| 3433228 | 4/1986 | Germany . |
| 3915934 | 11/1989 | Germany . |
| 3939214 | 6/1991 | Germany . |
| 4042136 | 7/1992 | Germany . |
| 1305973 | 2/1973 | United Kingdom . |
| 8911329 | 11/1989 | WIPO . |

OTHER PUBLICATIONS

Grant, *Grant and Hackh's Chemical Dictionary*, 1987 (no month) p. 303.

*Primary Examiner*—Gary P. Straub
*Assistant Examiner*—Thomas G. Dunn, Jr.
*Attorney, Agent, or Firm*—Nils H. Ljungman and Associates

[57] ABSTRACT

A powdered medium for the cleaning of exhaust gases, e,g. smoke and gases from industrial chimneys, employing the principle of dry adsorption, which includes a mixture of activated cokes with inert materials which have no dust explosiveness To prepare a mixture containing powdered activated cokes, in which mixture the concentration of carbon is up to 30% by weight and which when used in the airstream process under essentially all operating conditions, is not subject to virtually any fluctuations in concentration such that with a concentration of oxygen up to 21% by volume, no dust-explosive fractions can form, at least one inert material component in the mixture is matched in terms of its grain size distribution to the grain size distribution of the activated coke component, so that in a gas medium at rest, the speed of vertical descent of the coarse grain of the inert material components is substantially equal to or greater than the speed of vertical descent of the coarse grain of the activated coke components. The powdered medium can be used in essentially all exhaust gas cleaning systems, in separately operated or upstream or downstream adsorption stages employing the airstream principle.

22 Claims, 2 Drawing Sheets

METHOD FOR THE CLEANING OF EXHAUST GAS AND PREVENTION OF EXPLOSIONS THEREIN

This application is a Continuation-in-Part Application of International Application No. PCT/EP94/00320, filed on Feb. 4, 1994, which claims priority from Federal Republic of Germany P 43 03 450.0, filed on Feb. 5, 1993. International Application No. PCT/EP94/00320 was pending as of the filing date of this application and designated the U.S.A. as a designated state.

BACKGROUND OF THE INVENTION

1. Field of the Invention

The present invention relates to a powdered means for the cleaning of exhaust gases, e.g. gases exhausted from industrial smokestacks (smoke and chimney gases), employing the principle of dry adsorption. The powdered means generally includes a mixture of activated cokes with inert materials, which inert materials do not have any dust explosiveness.

2. Background Information

Activated cokes, such as activated carbon on a basis of hard coal or peat, or metallurgical cokes on a basis of lignite, are sometimes used with the admixture of inert materials for cleaning exhaust gas. Such mixtures have been used to remove acid pollutants (e.g. sulfuric acid, hydrochloric acid, hydrofluoric acid), organic substances such as chlorinated hydrocarbons (e.g. dioxins and furans), as well as heavy metals and heavy metal compounds from exhaust gas. In installations which function according to the airstream adsorption principle, such means are distributed as uniformly as possible in the current of smoke or chimney gas, react in flight when airborne with gaseous pollutants and other pollutants, and are precipitated on filters, along with other particulate constituents of the exhaust gas. The cleaned exhaust gas is then released through a chimney.

For the precipitation of acid pollutant gases, such as HCl $SO_2$, $SO_3$ and HF in the airstream process, reactive calcium compounds have been used in the past, such as finely-divided calcium hydroxides $Ca(OH)_2$. Calcium hydroxides for injection into the current of exhaust gases can be produced by various known processes, e.g. the process disclosed in German Patent DE 34 33 228.

Such known processes include the use of activated cokes, such as activated carbons and open hearth lignite cokes, for the removal of heavy metals, heavy metal compounds and organic compounds such as dioxins and furans, e.g. those which are found in the exhaust gases from municipal waste incineration plants.

One disadvantage of such processes is that when handling combustible adsorbents, even if the rules of the art are observed the use of activated cokes can entail the risk of dust explosions. In mixtures of inert materials with activated cokes. mixtures which are typically considered as non-explosive generally include at least mixtures with a concentration of carbon of less than or equal to 30% by weight. But, there are additional safety requirements which must typically be met for the use of these powdered means which include activated cokes and inert materials. Unless the mixtures are inherently safes precautionary measures to prevent explosions are essential, and such precautionary measures can significantly increase the cost of the airstream process. Under essentially no operating conditions may there be fluctuations in the concentration, as such fluctuations could form currents or even dust deposits which contain hazardous carbon concentrations.

In two-component mixtures, on the basis of reactive calcium compounds and powdered activated cokes, the granular structure of the individual components is so different that disruptive fluctuations in concentration are essentially unavoidable. With activated cokes, depending on the variety used, the maximum grain size which characterizes the granular structure can be between about 200 $\mu$m and about 500 $\mu$m, and with calcium hydroxide as the reactive calcium compounds the maximum grain size can be up to approximately 30 $\mu$m.

If such mixtures of different granular structure, e.g. mixtures of calcium hydroxide and activated cokes are used in the airstream process in exhaust gas cleaning systems, local fluctuations in concentration can occur in the flow field at points where there are centrifugal forces, such as in elbows. The larger particles are then enriched in the coarse grain fraction, i.e. there are higher carbon concentrations there.

It is essentially impossible to prevent small amounts of the coarse grain fraction which have an enriched carbon concentration from precipitating out of the flow field, and in particular at points through which there is not a strong flow. Laboratory tests with mixtures of calcium hydroxide and activated coke in laboratory wind sifters have shown that even with initial mixtures which have carbon concentrations of less than 30%, carbon enrichment can occur. Such carbon enrichments are generally unacceptable from a safety point of view.

It has been determined that this problem can essentially not be solved by the conventional grinding of the activated coke, in which the amount of coarse grain is limited so that even the coarsest particles can become airborne under the conditions of the airstream process (where the gas velocities are as low as 6 m/s).

Attempts to match or adjust the grain size distribution of the powdered activated cokes to the calcium hydroxide, so that both components have essentially the same distribution of the speed of vertical descent or drift, have shown that, of course, with sufficiently fine grinding there are essentially no further fluctuations in the concentration. But, that would require that the activated carbons be ground down to approximately the grain size of the calcium hydroxide, i.e. to <50 $\mu$m. For technical reasons, grinding down activated carbons to match the grain size of calcium hydroxide would typically be difficult and time-consuming, as well as economically unacceptable.

Alternatively, if an attempt were made to agglomerate finely-divided calcium hydroxide to the point where the distribution of its-speed of vertical descent or drift matched the distribution of the speed of vertical descent or drift of the activated coke, the effectiveness of the mixture for the separation of acid pollutant gases would be significantly reduced, so that such a solution also does not seem logical.

OBJECT OF THE INVENTION

The object of the present invention is therefore to prepare a mixture which contains powdered, activated coke, in which carbon is present in a concentration of up to 30% by weight and which, when used in essentially all fractions and under essentially all operating conditions in the airstream process, is not subject to any fluctuations in concentration, as such fluctuations, at oxygen concentrations of up to 21% by volumes would cause the formation of fractions which could cause dust explosions.

SUMMARY OF THE INVENTION

The present invention teaches that this object can be achieved if, in the mixture, at least one inert component is matched in terms of its grain size distribution to the grain size distribution of the activated coke components, so that in a gas medium at rest, the speed of vertical descent of the coarse grain of the inert components is equal to or greater than the speed of vertical descent of the coarse grain of the activated coke components.

Coarse grain, in accordance with at least one embodiment of the present invention can be defined as the particle size $d_{97}$, the cumulative value of which equals 97% of the particle size distribution (i.e. 97% of all the particles in the powder are smaller than $d_{97}$).

With an accuracy which is acceptable in practical terms, equal speeds of vertical descent in the gas medium are achieved when the $d_{97}$ values of the particle size distributions of the activated coke and of the inert material are in inverse proportion to the roots of the particle densities of activated coke and inert components (particle densities as defined in DIN 66160 (Deutsche Industrie-Norm or German Industrial Standards located at Deutsche Institut Fur Normung e.V., Sprachendienst, Post Fach 11 07, D-1000, Berlin 30, Federal Republic of Germany)).

In accordance with one embodiment of the present invention, equal speeds of vertical descent in the gas medium can possibly be achieved when the $d_{97}$ values of the particle size distributions of the activated coke and of the inert material are in inverse proportion to the square roots of the particle densities of activated coke and inert components. In accordance with an alternative embodiment of the present invention, equal speeds of vertical descent in the gas medium can possibly be achieved when the $d_{97}$ values of the particle size distributions of the activated coke and of the inert material are in inverse proportion to the cube roots of the particle densities of activated coke and inert components.

A preferred mixture is one in which the slope or gradient of the grain size distribution line of at least one inert component with matching grain size (i.e. the inert component having a grain size matching the grain size of the activated coke) is equal to or greater than the slope of the grain size distribution line of the activated coke component (See DIN 66145 for a description of grain size distributions by RRSB (Rosin-Rammler-Sperling-Bennett lines). Further explanations of grain size distributions by RRSB can be found in the Journal of the Institute of Fuel, volume 7, pages 29, in an article by Rosin and Rammler, and in volume 10, page 22, in an article by Bennett, are incorporated by reference herein.

In view of the above requirements, it has suprisingly been determined that powdered limestone can be used as the inert material. It is generally known that limestone is essentially calcium carbonate with a possible magnesium carbonate content.

Reactive calcium compounds with non-matching grain sizes can be used as additional inert materials. Calcium hydroxide is particularly preferred for such a purpose.

It is within the scope of the present invention that other inert materials could be used, in certain embodiments of the present invention, such as pulverized granite, slates or quartz. Further, it is also conceivable that other types of reactive calcium compounds could be used in accordance with certain embodiments of the present inventions in addition to calcium hydroxide, such as calcium silicates, calcium alkalis, and calcium reactive silicas.

The powder mixture of the present invention has been found to be useful in essentially all exhaust gas cleaning systems having separately operated, upstream or downstream adsorption stages which employ the airstream principle.

If several inert components are used to achieve a properly matching distribution of the speed of vertical descent, it is of particular advantage if safe carbonaceous mixtures for the airstream process can be manufactured which contain as little additional inert material as possible. Likewise, it is possible to use, as the inert materials one or more exhaust gas cleaning reagents, if the reagents act as inert material with respect to the explosiveness of powdered activated coke, and if the reagents are present in the desired grain size distribution. One preferred inert material which has been found to satisfy the above requirements is powdered limestone, which is available economically and in many finenesses of grind. Powdered limestone is not a pollutant and is in no way toxic.

Additional advantages of the preferred mixtures manufactured in accordance with the present invention, as compared to the mixtures of the past, are that in mixtures of activated coke which use basic exhaust gas cleaning reagents as the inert material, it becomes possible to manufacture inherently safe mixtures with the smallest possible percentage of inert material which is matched to the grain size distribution of the activated coke and the percentage of carbon. In mixtures of activated cokes and an inert material which does not react with the exhaust gas, or reacts with it only to a limited extent, safe mixtures can be manufactured which contain carbon concentrations in percentages of up to 30%. The limitation of the percentages of inert components in the reagent preferably minimizes the amount which must be used and therefore can offer advantages in terms of cost.

In processes which employ the wet washing or scrubbing principle, the pre-cleaned exhaust gas can typically contain either no acid pollutant components or only very small concentrations of acid pollutant components. However, the pre-cleaned exhaust gas will still typically contain organic compounds and heavy metals.

In an upstream or downstream sorption stage, that is, upstream or downstream of the precleaning stage, one exhaust gas cleaning means in accordance with the present invention for cleaning exhaust gas can preferably have the following composition (parts by weight in %):

25% activated coke breeze

70% inert material (e.g. powdered limestone) matching the grain size of the activated coke 5% highly-reactive calcium hydroxide The principal ingredient in such a mixture can be an economical inert material, the speed of vertical descent of which material preferably matches the coarse activated coke breeze. If, under extreme circumstances deposits do occur in the exhaust gas cleaning system, there would typically also be an inert material content in the deposit, which inert material can then prevent undesirable and hazardous carbon concentrations in these deposits. The highly-reactive calcium hydroxide component in this mixture preferably makes possible a residual separation of acid exhaust gas components, if necessary.

This example of a mixture represents a solution for gas scrubbing which has been found to be both economical and optimal in terms of safety with regard to the relevant pollutant components of the exhaust gas.

In the process which employs the principle of spray sorption, the pre-cleaned exhaust gas, depending on the type of operation, can contain significant concentrations of acid pollutant components, as well as organic compounds and heavy metals.

In this case, the exhaust gas cleaning means in accordance with the invention can have the following composition in a downstream exhaust gas cleaning (parts by weight in %):

10% activated coke breeze

10% inert material (e.g. powdered limestone) which matches the grain size of the activated coke 80% highly-reactive calcium hydroxide If such a mixture is used, in spite of the high reactivity of the calcium hydroxide additive with respect to acid pollutant components, minimal to no concentration fluctuations have been found to occur in any deposits which may occur, even in extreme cases, which fluctuations can lead to hazardous carbon concentrations.

The mixture can be used in spray sorption systems and also as a milk-of-lime suspension (i.e. a suspension of the mixture in water) in single-stage operations.

This example of a mixture represents a solution which is both economical and optimal from a safety point of view for spray sorptions of downstream exhaust gas cleaning systems with regard to the relative polluting components of the exhaust gas.

In processes which employ the dry sorption principle, depending on the type of operation, the pre-cleaned exhaust gas typically still contains significant concentrations of acid pollutant components as well as organic compounds and heavy metals.

In this case, the exhaust gas cleaning means claimed by the invention can have the following composition (parts by weight in %):

5% activated coke breeze

3% inert material (e.g. powdered limestone) matching the grain size of the activated coke 92% highly-reactive calcium hydroxide The use of such a mixture can essentially provide an effective adsorption of acid pollutant components of the exhaust gas. Such a mixture can also essentially provide that, in the event of unfavorable conditions in the exhaust gas cleaning system, no deposits of coarse particles with unacceptably high carbon concentrations can occur.

The above examples of various compositions of mixtures in accordance with the present invention show that it is possible to solve the problems of unacceptable fluctuations in carbon concentrations in deposited material both in separately operated adsorption stages, and in upstream or downstream adsorption stages, for the relevant pollutant components.

One aspect of the invention resides broadly in a method of reducing explosions during the cleaning of exhaust gas, the method comprising the steps of: providing activated carbon, the activated carbon having a first grain size distribution; providing at least one inert material, the at least one inert material having a second grain size distribution, the second grain size distribution being substantially the same as the first grain size distribution; preparing a mixture of the activated carbon and the at least one inert material; introducing the mixture into a flow of exhaust gas; and cleaning the exhaust gas by adsorption of portions of the exhaust gas by the activated carbon.

Another aspect of the invention resides broadly in powdered means for cleaning exhaust gases using the principle of dry adsorption which consists of a mixture of activated cokes with inert materials which have no dust explosiveness, characterized by the fact that in the mixture, at least one of the inert material components is matched in terms of its grain size distribution to the grain size distribution of the activated coke component so that in a gas medium at rest, the speed of vertical descent of the coarse grain of the inert material component is equal to or greater than the speed of vertical descent of the coarse grain of the activated coke component.

BRIEF DESCRIPTION OF THE DRAWINGS

The present invention is explained below in greater detail with reference the examples listed below in a table and with reference to the embodiment and the graph illustrated in the accompanying drawings, in which.

DESCRIPTION OF THE PREFERRED EMBODIMENT

Figure 1:
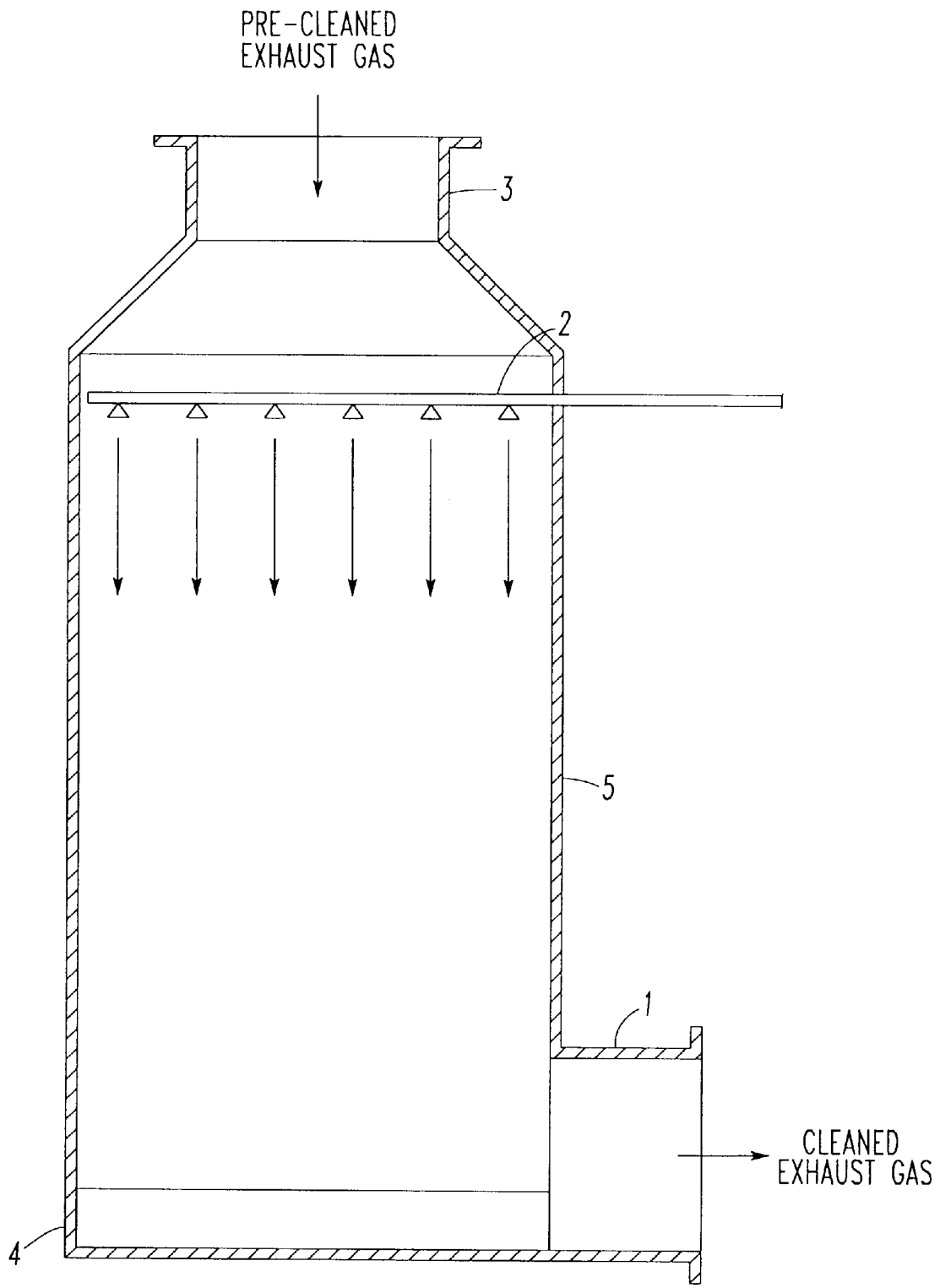
FIG. 1 shows an apparatus for cleaning exhaust gas in accordance with the present invention.

In Example 1, shown further below in the table, in accordance with a known mixture of the past, the activated coke was ground to 0% residue at 75 $\mu$m (which is about the same as approximately 3% residue at 43 $\mu$m) and mixed with standard hydrate, that is, hydroxide.

Examples 2 to 21 are mixtures in accordance with the embodiments of the present invention The mixtures 2 to 20 were prepared on the basis of classes of speeds of vertical descent, preferably in a gas medium at rest, so that in no class of the speed of vertical descent is there an activated coke concentration of more than about 30%. In Example 21, a maximum allowable concentration of activated coke of about 40% by weight was assumed not to be hazardous. In the three-component mixtures, the value required in actual practice for the proportion of inert material 1 required to observe the maximum carbon concentration is less than the value shown, since coarse particles of coke and inert materials can entrain fine calcium hydroxide, and thus the actual carbon concentration will be less than about 30% or about 40% respectively. Therefore, in the table, the concentrations of inert material 1 preferably are maximum values.

Examples 2 to 5 are two-component mixtures on the basis of activated coke and various inert materials. In the inert materials in Mixtures 2 to 4, the coarse grain of the inert materials has been matched to that of the activated coke. In Mixture 2, the inert material has also been matched with respect to the slope of the activated coke component. In Mixture 3, the grain size distribution of the inert material is steeper than the grain size distribution of the activated coke component. In Mixture 4, the grain size distribution of the inert material is flatter than the grain size distribution of the activated coke component. In Mixture 5, the coarse grain of the inert material is coarser than with the matched powdered limestones, and the slope of the grain size distribution, at about 0.98 $\mu$m, is approximately 0.25 steeper than the slope of the activated coke component. It is apparent that, in the two-component mixtures (Examples 2–5) of activated coke and inert material 1, in this case powdered limestone, the least inert material is needed if an inert material 1 is used which matches in terms of the coarse grain (approximately 50% of the value of the coke) and slope ($n_{inert\ material\ 1} = n_{activated\ coke}$).

Examples 2, 5, 6 and 7 show that in the transition from a two-component mixture (activated coke and (coarse) inert material 1) to a three-component mixture (activated coke, (coarse) inert material 1 and (fine) inert material 2), with the inert material 1 which ideally matches the activated coke, the proportions of inert material 1 essentially cannot be reduced. However, in three-component mixtures, the proportion of inert material 1 can be reduced if an inert material is used which is somewhat coarser, and the grain size distribution of which is somewhat steeper than the inert material 1 which matches the activated coke (Examples 5, 8 to 11, 12 to 14, 15 to 17).

Examples 18 to 20 show that even with low activated coke concentrations the proportion of inert material 1 can be reduced from 57 parts to 26 or 16 parts respectively by the use of inert material 2. Example 21 shows that if a fluctuation of the concentration up to an activated coke concentration of up to about 40% is allowable, the (undesirable) concentration of inert material 1 can be reduced from 16 to 11 parts.

TABLE

Compositions of various mixtures of activated cokes with inert materials

| Example No. | Activated Coke | Inert Material 1 | Inert Material 2 |
|---|---|---|---|
| 1 | Activated Coke A 30 parts | | Calcium hydroxide A 70 parts |
| 2 | Activated Coke D 30 parts | Inert material A 70 parts | |
| 3 | Activated Coke D 30 parts | Inert material B 189 parts | |
| 4 | Activated Coke D 36 parts | Inert material C 93 parts | |
| 5 | Activated Coke D 30 parts | Inert material D 170 parts | |
| 6 | Activated Coke D 30 parts | Inert material A max. 70 parts | Calcium hydroxide A 70 parts |
| 7 | Activated Coke D 30 parts | Inert material A max. 70 parts | Calcium hydroxide B 70 parts |
| 8 | Activated Coke D 30 parts | Inert material D max. 63 parts | Calcium hydroxide A 70 parts |
| 9 | Activated Coke D 30 parts | Inert material D max. 59 parts | Calcium hydroxide B 70 parts |
| 10 | Activated Coke D 30 parts | Inert material D max. 77 parts | Calcium hydroxide A 10 parts |
| 11 | Activated Coke D 30 parts | Inert material D max. 102 parts | Calcium hydroxide B 10 parts |
| 12 | Activated Coke B 30 parts | Inert material D 95 parts | |
| 13 | Activated Coke B 30 parts | Inert. material D max. 80 parts | Calcium hydroxide A 70 parts |
| 14 | Activated Coke B 30 parts | Inert material D max. 74 parts | Calcium hydroxide B 70 parts |
| 15 | Activated Cdke C 30 parts | Inert material E 91 parts | |
| 16 | Activated Coke C 30 parts | Inert material E max. 72 parts | Calcium hydroxide A 70 parts |
| 17 | Activated Coke C 30 parts | Inert material E max. 73 parts | Calcium hydroxide B 70 parts |
| 18 | Activated Coke D 10 parts | Inert material D 57 parts | |
| 19 | Activated Coke D 10 parts | Inert material D max. 26 parts | Calcium hydroxide B 10 parts |
| 20 | Activated Coke D 10 parts | Inert material D max. 16 parts | Calcium hydroxide B 90 parts |
| 21 | Activated Coke D 10 parts | Inert material D max. 11 parts | Calcium hydroxide B 90 parts |

The values listed in the above table, in accordance with certain embodiments of the present invention can preferably be usable compositions and variations in one component could be compensated for in another component. For example, if it were desirable to keep the amounts of calcium hydroxide to a minimum possibly due to economic considerations, more, or possibly less, of the inert material could be used.

The definitions of the terms used in the tables are explained below.

Inert materials are inert materials with a grain density which is higher than the activated coke and with a $d_{97}$ value in the range of greater than or equal to 50% in relation to the activated coke used.

Inert materials 2, in contrast to inert material 1, are finely-divided calcium hydroxides, and are used in the airstream process as a reagent for the separation of acid components of the gaseous pollutants.

Activated Coke A: Metallurgical coke 0% residue to 75 $\mu$m RRSB: not indicated Grain density: $P_K$=0.95 g/cm$^3$ Activated Coke B: Metallurgical coke 3% residue to 110 $\mu$m RRSB: d'=36 $\mu$m, n=1.08 Grain density: $P_K$=0.95 g/cm$^3$ Activated Coke C: Metallurgical coke 3% residue to 200 $\mu$m RRSB: d'=52 $\mu$m, n=0.94 Grain density $P_K$=0.95 g/cm$^3$ Activated Coke D: Activated coke on peat basis 3% residue to 158 $\mu$m RRSB: d'=28 $\mu$m, n=0.73 Grain density $P_K$=approx. 0.8 g/cm$^3$ Inert Material A: Powdered limestone 3% residue to 85.5 $\mu$m RRSB: d'=15.3 $\mu$m, n=0.73 Grain density $P_K$=2.66 g/cm$^3$ Inert Material B: Powdered limestone 3% residue to 85.5 $\mu$m RRSB: d'=30 m, n=1.2 Grain density $P_K$=2.66 g/cm$^3$ Inert Material C: Powdered limestone 3% residue to 85.5 $\mu$m RRSB: d'=11 $\mu$m, n=0.6 Grain density $P_K$=2.66 g/cm$^3$ Inert Material D: Powdered limestone 3% residue to 105 $\mu$m RRSB: d'=30 $\mu$m, n=0.97 Grain density $P_K$=2.66 g/cm$^3$ Inert Material E: Powdered limestone 3% residue to 145 $\mu$m RRSB: d'=39 $\mu$m, n=096 Grain density $P_K$=2.66 g/cm$^3$ Calcium Hydroxide A: Calcium hydroxide 3% residue to 47 $\mu$m 50% residue to 5.2 $\mu$m Grain density $P_K$=approx. 0.8 g/cm$^3$ Calcium Hydroxide B: Calcium hydroxide 3% residue to 22 $\mu$m 50% residue to 3.4 $\mu$m Grain density $P_K$=approx. 0.6 g/cm$^3$ With regard to the last two designations, it should be noted that it is not appropriate to characterize calcium hydroxides by RRSB grain size distribution parameters, since the grain size distributions of these materials cannot be described by straight lines in the RRSB system.

One possible interpretation of the table listed immediately above, in accordance with one embodiment of the present invention, with regard to Activated Coke B for example, is that 3% of the metallurgical coke has a grain size diameter of greater than 110 $\mu$m.

In accordance with certain embodiments of the present invention, it is conceivable that d' represents the coarse grain size of a particular particle. Further, it may be conceivable in some embodiments that d' is the $d_{97}$ value.

It should also be noted that, in accordance with at least one embodiment of the present inventions the word "inert", when used in this specification, does not necessarily refer to the chemical definition of "inert". Thus, use of the word "inert", when used to describe powdered limestone and calcium hydroxide, may instead imply that these two substances are inert with respect to the activated coke material, and therefore may not react chemically with the activated coke material. Further, in accordance with at least one embodiment of the present invention, the powdered limestone and the calcium hydroxide may also be inert with respect to the activated coke material in that they may not contribute to the flammability of the activated coke material.

Further, in accordance with at least one embodiment of the present invention, the powdered limestone may be inert with respect to reactivity and flammability with the activated coke material and with respect to the exhaust gas itself.

The calcium hydroxide, in accordance with at least one embodiment of the present invention, may be inert with respect to reactivity and flammability with respect to the activated coke material, but is preferably reactive with the acidic components of the exhaust gas.

Thus, in accordance with one embodiment of the present invention, when the grain size distribution of the powdered limestone is matched to the grain size distribution of the activated coke material, possibly by testing their speeds of vertical descent in a gas medium at rest, when the mixture of powdered limestone and activated coke material is introduced into the exhaust gas flow, the coarse grain of the powdered limestone and the coarse grain of the activated coke can preferably vertically descend through the exhaust gas at substantially the same speed. Therefore, the grains of the powdered limestone can conceivably act as a "barrier" between the grains of the activated coke material, and can possibly prevent combustion or explosion of the grains of the activated coke material.

FIG. 1 shows a schematic representation of an exhaust gas cleaning apparatus which could, in accordance with one embodiment of the present invention, be utilized in accordance with the present invention. In accordance with one embodiment of the present invention shown in FIG. 1, the pre-cleaned exhaust gas could be introduced into the apparatus at or near the top 3 and could exit through passage 1 The powdered mixture of activated coke and inert materials, and possibly calcium hydroxide, can be injected or blown into shaft 5 with the aid of nozzles 2, which nozzles 2 can be distributed substantially evenly across the apparatus.

Further, the apparatus shown in FIG. 1 can also have a collection device 4 for collecting the impurities removed from the exhaust gas. A filter could also be used as a collection device.

In accordance with an alternative embodiment not shown here, the pre-cleaned exhaust gas could be introduced into shaft 5 from below from a passage 1. The powdered mixture of activated coke and inert materials, and possibly calcium hydroxide, can be injected or blown into shaft 5 with the aid of nozzles 2. Thus, in accordance with this embodiment, the powdered mixture can descend and can react with certain constituents of the ascending pre-cleaned exhaust gas. The cleaned exhaust gas can then exit at the top 3 of the apparatus.

One possible temperature range at which the exhaust gas may react with the powdered mixture in accordance with one embodiment of the present invention is about 20° C. to about 400° C. Another possible temperature range at which the exhaust gas may react with the powered mixture in accordance with an additional embodiment of the present invention is about 400° C. to about 900° C. It should be understood that the temperature ranges stated above are only approximations and that such ranges could extend to greater or lower temperatures depending on the particular operating conditions.

In accordance with an additional alternative embodiment of the present inventions the powdered mixture could be introduced into the apparatus illustrated in FIG. 1 in stages along the shaft 5 of the apparatus. Thus, there could preferably be several sets of nozzles 2 disposed at points between the position of the nozzles 2 shown in FIG. 1 and the collection device 4.

The present inventions in accordance with at least one embodiments can be used to clean exhaust gases from waste or refuse incineration plants. Such refuse incineration plants can preferably be used to process household refuses waste, or rubbish.

It is also conceivable that the present inventions in accordance with additional embodiments, could be used to clean the exhaust gas which results from the processing of industrial waste, such as chemical waste. Furthers the present invention may, in accordance with additional conceivable embodiments, be used to clean the exhaust gas resulting from the processing of oils, tires, or other types of industrial and consumer waste.

Figure 2:
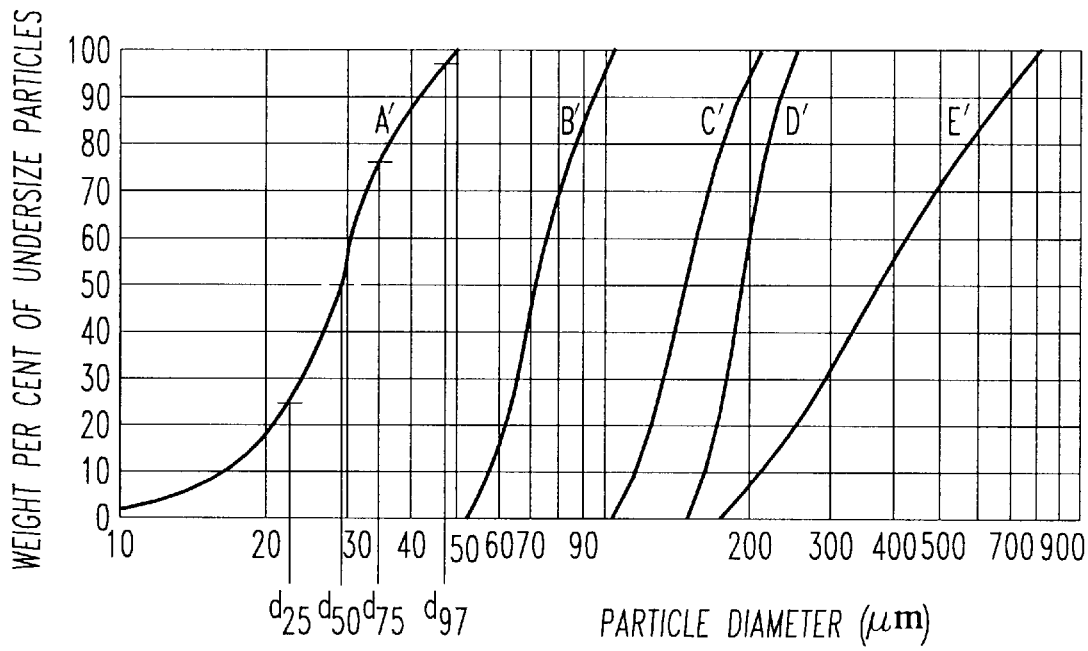
FIG. 2 shows one example of various possible grain distribution lines.
Figure 3:
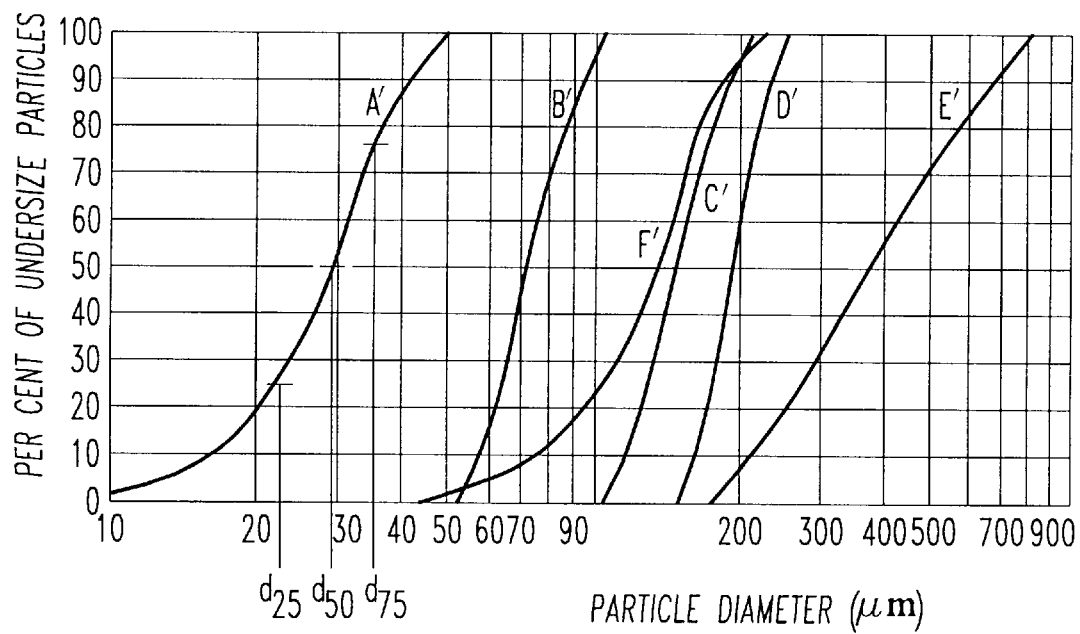
FIG. 3 shows an additional example of possible grain distribution lines for activated coke and an inert material.

FIG. 2 shows several examples of possible grain distribution lines. The cumulative weight percentage of undersize particles is plotted against the particle diameter in $\mu$m. The cumulative percentage can also refer to number of particles or volume of particles. The graph shown in FIG. 2 could, in accordance with one embodiment of the present invention, be used to match the grain size distribution of the activated coke component and at least one of the inert components For examples lines A', B', C', D', and E' could possibly correspond to the grain size distribution lines of various types of activated coke. The grain size distribution lines of the inert material (i.e. the inert material which is to match the grain size distribution of the activated coke in accordance with the present invention) could then be plotted on the same graph, as is shown in FIG. 3. Thus, the inert materials which have slopes equal to or greater than the activated coke which is to be used can be selected and incorporated into the powdered mixture of the present invention.

As stated above, the graphs shown in FIGS. 2 and 3 could conceivably be used to match the grain size distribution of the activated coke and the inert material (i.e. the powdered limestone). For example, in FIG. 3, F' could represent the grain distribution line of the inert materials or powdered limestone, and C' could represent the the grain distribution line of the activated coke.

A parametric representation of the size distribution is frequently achieved by fitting the actual distribution curve either to the normal (Gaussian) distribution function or the log-normal distribution functions, which log-normal distribution function can be depicted on a cumulative plot of percentage oversized particles versus particle diameters as compared to the plot shown in FIG. 2 for percentage of undersized particles. The Gaussian distribution function is written for particle diameter as:

$$N = \frac{\Sigma N}{\sigma \sqrt{\pi}} \exp\left[-\frac{1}{2}\left(\frac{d - \bar{d}}{\sigma}\right)^2\right]$$

One feature of the invention resides broadly in the powdered means for cleaning exhaust gases using the principle of dry adsorption which consists of a mixture of activated cokes with inert materials which have no dust explosiveness, characterized by the fact that in the mixture, at least one of the inert material components is matched in terms of its grain size distribution to the grain size distribution of the activated coke component so that in a gas medium at rest, the speed of vertical descent of the coarse grain of the inert material component is equal to or greater than the speed of vertical descent of the coarse grain of the activated coke component.

Another feature of the invention resides broadly in the means characterized by the fact that the slope of the grain size distribution line of at least one inert material component with matching grain size is equal to or greater than the slope of the grain size distribution line of the activated coke component.

Yet another feature of the invention resides broadly in the means characterized by the fact that the inert material component with the matching grain size is powdered limestone.

Still another feature of the invention resides broadly in the means characterized by the fact that an additional inert material component with a non-matching grain size contains reactive calcium compounds.

A further feature of the invention resides broadly in the means characterized by the fact that the reactive calcium compound is calcium hydroxide.

Another feature of the invention resides broadly in the use of the means in exhaust gas cleaning systems with separately operated or upstream or downstream adsorption stages which operate according to the airstream principle.

Yet another feature of the invention resides broadly in the use of the means characterized by the fact that it is used in spray sorption systems as a milk-of-lime suspension.

Types of adsorption processes and apparatus' which may be used in accordance with the present invention may be disclosed in the following U.S. Pat. No. 5,176,721 to Hay et al. on Jan. 5, 1993, entitled "Adsorber and Process for the Separation by Adsorption"; U.S. Pat. No. 5,203,889 to Brown on Apr. 20, 1993, entitled "Process and System for Fractionating Gaseous Mixture"; and U.S. Pat. No. 5,283,123 to Carter et al. on Feb. 1, 1994, entitled "Adsorption Material and Method".

Wet scrubbing processes and apparatus' which may be used in accordance with the present invention may be disclosed in the following U.S. Pat. No. 5,310,498 to Lee et al. on May. 10, 1994, entitled "Sulfur Dioxide Removal from Gases Using a Modified Lime"; U.S. Pat. No. 5,270,026 to College et al. on Dec. 14, 1993, entitled "Sulfur Dioxide Scrubbing Process Producing Purified Magnesium Hydroxide"; and U.S. Pat. No. 5,260,045 to Moser et al. on Nov. 9, 1993, entitled "Modification of Magnesium-enhanced Lime Flue Gas Desulfurization Process to Improve Solids Dewatering".

Various methods of cleaning exhaust gases which may be utilized in accordance with the present invention may be disclosed in the following U.S. Pat. No. 5,254,797 to Imoto et al. on Oct. 19, 1993, entitled "Method of Treating Exhaust Gas"; U.S. Pat. No. 5,185,134 to Gullett on Feb. 9, 1993, entitled "Reduction of Chlorinated Organics in the Incineration of Wastes"; U.S. Pat. No. 5,220,111 to Bucci et al. on Jun. 15, 1993, entitled "Fixation of Heavy Metals in Scrubbed Municipal Solid Waste Incinerator Ash"; and U.S. Pat. No. 5,186,916 to Nevels on Feb. 16, 1993, entitled "Method for Purifiying Flue-gases".

Various methods of cleaning exhaust gases involving the sorption process which may be utilized in accordance with the present invention may be disclosed in the following U.S. Pat. No. 5,320,817 to Hardwick et al. on Jun. 14, 1994, entitled "Process for Sorption of Hazardous Waste Products from Exhaust Gas Streams"; U.S. Pat. No. 5,291,942 to Ryan on Mar. 8, 1994, entitled "Multiple Stage Sorption and Desorption Process and Apparatus"; U.S. Pat. No. 5,209,912 to Suchenwirth on May 11, 1993, entitled "Process for Separating Out Noxious Substances from Gases and Exhaust Gases"; and U.S. Pat. No. 5,277,837 to Dumont et al. on Jan. 11, 1994, entitled "Method and Composition for Treating Flue or Exhaust Gases Utilizing Modified Calcium Hydroxide".

Methods for forming activated cokes and carbons which may be utilized in accordance with the present invention may be disclosed in the following U.S. Pat. No. 5,270,279 to Shiraishi on Dec. 14, 1993, entitled "Production Process of Formed Activated Coke for SOx and NOx Removal Having High NOx-Removing Ability"; U.S. Pat. No. 5,187,141 to Jha et al. on Feb. 16, 1993, entitled "Process for the Manufacture of Activated Carbon from Coal by Mild Gasification and Hydrogenation"; U.S. Pat. No. 5,202,302 to De La Pena et al. on Apr. 13, 1993, entitled "Preparation of Activated Carbons by Impregnation With a Boron Compound and a Phosphorous Compound", and U.S. Pat. No. 5,209,887 to Von Blucher et al. on May 11, 1993, entitled "Process for Manufacturing Micro-spherules of Activated Carbon".

Various apparatuses and processes for incinerating refuse which could possibly be used in the context of the present invention are more fully disclosed in the following U.S. Pat. No. 4,006,693 to Hans Kunstler, entitled "Combustion Furnace Construction Particularly a Refuse Incinerator"; U.S. Pat. No. 4,516,511 to Tsung Kuo, entitled "Refuse Incineration Apparatus"; U.S. Pat. No. 4,706,560 to Gaetano Capodicasa, entitled "Refuse Treatment Apparatus"; U.S. Pat. No. 4,936,231 to Loyd Johnson, entitled "Solid Waste Garbage Incineration System", U.S. Pat. No. 4,949,653 to James Rast, entitled "Process and Apparatus for Incineration"; and U.S. Pat. No. 5,009,173 to Sedat Temelli, entitled Apparatus for Incineration of Refuse.

Similarly, various apparatuses and process for cleaning of the flue gases which could possibly be used in the context of the present invention may be disclosed in the following U.S. Pat. No. 5,018,457 to Brady et al., entitled "Waste Treatment System"; U.S. Pat. No. 5,050,508 to Paul Wilson, entitled "System for the Incineration of Refuse and the Treatment of the Incineration Exhaust Gasses"; and U.S. Pat. No. 5,127,347 to Eric Cheetham, entitled "Method and Apparatus for the Reduction of Solid Waste Material Using Coherent Radiation".

Filter arrangements which could be utilized in accordance with the present invention may be found in the following U.S. Pat. No. 4,416,674 to McMahon et al., entitled "Filter for Treating a Particle-Carrying Gaseous Stream"; U.S. Pat. No. 4,862,813 to Levin et al., entitled "High Temperature Gas Cleaning in Municipal Solid Waste Incineration Systems", U.S. Pat. No. 4,971,769 to Hans Haerle, entitled "Filter Device of use in Heating or Incineration Plants".

Methods of cleaning flue or exhaust gas using calcium compounds which may be utilized in accordance with the present invention may be disclosed in the following U.S. Pat. No. 5,270,015 to Rochelle et al. on Dec. 14, 1993, entitled "Apparatus for Removing Sulfur from Sulfur Containing Gases"; and U.S. Pat. No. 5,306,475 to Fichtel et al. on Apr. 26, 1994, entitled "Reactive Calcium Hydroxides".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. In a method of cleaning industrial combustion exhaust gas utilizing activated coke, the activated coke being capable of exploding upon the industrial combustion exhaust gas and the activated coke being mixed together; the activated coke having a grain size distribution including a portion of coarse grains and a portion of fine grains; the grains of the activated coke being entrainable in the flow of industrial exhaust gas; the method including: selecting at least one explosion suppressive material having a grain size distribution including a portion of coarse grains and a portion of fine grains; the grains of the at least one explosion suppressive material being entrainable in the flow of industrial combustion exhaust gas; mixing the activated coke and the at least one explosion suppressive material and thus forming a mixed powder; providing a sufficient amount of the activated coke in the mixed powder to remove a majority of the impurities in the industrial combustion exhaust gas; dispersing the mixed powder into a moving stream of industrial combustion exhaust gas and entraining the mixed powder in the moving stream of industrial combustion exhaust gas, the improvement comprising:

selecting the grain size distribution of said at least one explosion suppressive material to match the grain size distribution of the activated coke such that upon the activated coke and the at least one explosion suppressive material being dispersed in a gas medium, the coarse grains of the at least one explosion suppressive material have a speed of vertical descent which matches the speed of vertical descent of the coarse grains of the activated coke;

the mixed powder having a concentration of carbon up to about 40% and also being able to suppress explosions of the mixture of the industrial combustion gas and the activated coke; and cleaning the industrial combustion gas by adsorption of portions of the industrial combustion gas with the mixed powder while suppressing explosions of the mixture of the industrial combustion exhaust gas and the activated coke with the at least one explosion suppressive material.

2. The method of claim 1, wherein the speeds of vertical descent are measured while said gas medium is at rest.

3. The method according to claim 2 wherein the grain size distribution of the activated coke and the grain size distribution of the at least one explosion suppressive material each have a slope of particle amount to particle diameter, and further wherein:

said step of selecting the grain size distribution of the at least one explosion suppressive material comprises selecting the at least one explosion suppressive material to have said slope at least as great as the slope of said grain size distribution of said activated coke.

4. The method according to claim 3 wherein the grain size distributions are determined by the RRSB (Rosin-Rammler-Sperling-Bennett) method.

5. The method according to claim 4 wherein said at least one explosion suppressive material comprises powdered limestone.

6. The method according to claim 5 wherein said coarse grains of said activated coke and said at least one explosion suppressive material have a particle size $d_{97}$ of the grain size distribution.

7. The method according to claim 6 wherein said method comprises adding calcium hydroxide to the mixed powder.

8. The method according to claim 7 wherein said method comprises dispersing the mixed powder in a spray sorption system as a milk-of-lime suspension.

9. In a method of cleaning industrial combustion exhaust gas utilizing activated coke, the activated coke being capable of exploding upon the industrial combustion exhaust gas and the activated coke being mixed together; the activated coke having a grain size distribution including a portion of coarse grains and a portion of fine grains; the grains of the activated coke being entrainable in the flow of industrial exhaust gas; the method including: selecting at least one explosion suppressive material having a grain size distribution including a portion of coarse grains and a portion of fine grains; the grains of the at least one explosion suppressive material being entrainable in the flow of industrial combustion exhaust gas; mixing the activated coke and the at least one explosion suppressive material and thus forming a mixed powder; providing a sufficient amount of the activated coke in the mixed powder to remove a majority of the impurities in the industrial combustion exhaust gas; dispersing the mixed powder into a moving stream of industrial combustion exhaust gas and entraining the mixed powder in the moving stream of industrial combustion exhaust gas, the improvement comprising:

selecting the grain size distribution of said at least one explosion suppressive material to match the grain size distribution of the activated coke such that upon the activated coke and the at least one explosion suppressive material being dispersed in a gas medium, the coarse grains of the at least one explosion suppressive material have a speed of vertical descent at least as great as the speed of vertical descent of the coarse grains of the activated coke;

the mixed powder having a concentration of carbon up to about 40% and also being able to suppress explosions of the mixture of the industrial combustion gas and the activated coke; and cleaning the industrial combustion gas by adsorption of portions of the industrial combustion gas with the mixed powder while suppressing explosions of the mixture of the industrial combustion exhaust gas and the activated coke with the at least one explosion suppressive material.

10. The method of claim 9, wherein the speeds of vertical descent are measured while said gas medium is at rest.

11. The method according to claim 10 wherein said at least one explosion suppressive material comprises powdered limestone.

12. The method according to claim 11 wherein the grain size distribution of the activated coke and the grain size distribution of the at least one explosion suppressive material each have a slope of particle amount to particle diameter, and further wherein:

said step of selecting the grain size distribution of the at least one explosion suppressive material comprises selecting the at least one explosion suppressive material to have said slope which is essentially about the same as and at least as great as the slope of said grain size distribution of said activated coke.

13. The method according to claim 12 wherein the grain size distributions are determined by the RRSB (Rosin-Rammler-Sperling-Bennett) method.

14. The method according to claim 13 wherein said coarse grains of said activated coke and said at least one explosion suppressive material have a particle size $d_{97}$ of the grain size distribution.

15. The method according to claim 14 wherein said method comprises adding calcium hydroxide to the mixed powder.

16. The method according to claim 15 wherein said method comprising dispersing the mixed powder in a spray sorption system as a milk-of-lime suspension.

17. In a method of cleaning industrial combustion exhaust gas utilizing activated coke, the activated coke being capable of exploding upon the industrial combustion exhaust gas and the activated coke being mixed together; the activated coke having a grain size distribution including a portion of coarse grains and a portion of fine grains; the grains of the activated coke being entrainable in the flow of industrial exhaust gas; the method including: selecting at least one explosion suppressive material having a grain size distribution including a portion of coarse grains and a portion of fine grains; the grains of the at least one explosion suppressive material being entrainable in the flow of industrial combustion exhaust gas; mixing the activated coke and the at least one explosion suppressive material and thus forming a mixed powder; providing a sufficient amount of the activated coke in the mixed powder to remove a majority of the impurities in the industrial combustion exhaust gas; dispersing the mixed powder into a moving stream of industrial combustion exhaust gas and entraining the mixed powder in the moving stream of industrial combustion exhaust gas, the improvement comprising:

selecting the grain size distribution of said at least one explosion suppressive material to match the grain size distribution of the activated coke such that upon the activated coke and the at least one explosion suppressive material being dispersed in a gas medium, the coarse grains of the at least one explosion suppressive material have a speed of vertical descent which is essentially about the same as and at least as great as the speed of vertical descent of the coarse grains of the activated coke;

the mixed powder having a concentration of carbon up to about 40% and also being able to suppress explosions of the mixture of the industrial combustion gas and the activated coke; and cleaning the industrial combustion gas by adsorption of portions of the industrial combustion gas with the mixed powder while suppressing explosions of the mixture of the industrial combustion exhaust gas and the activated coke with the at least one explosion suppressive material.

18. The method of claim 1, wherein the speeds of vertical descent are measured while the gas medium is at rest.

19. The method of claim 18 wherein the grain size distributions are determined by the RRSB (Rosin-Rammler-Sperling-Bennett) method; and said coarse grains of said activated coke and said at least one explosion suppressive material have a particle size of $d_{97}$ of the grain size distribution.

20. The method according to claim 19 wherein the grain size distribution of the activated coke and the grain size distribution of the at least one explosion suppressive material each have a slope of particle amount to particle diameter, and further wherein:

said step of selecting the grain size distribution of the at least one explosion suppressive material comprises selecting the at least one explosion suppressive material to have said slope at least as great as the slope of said grain size distribution of said activated coke.

21. The method according to claim 20 wherein said at least one explosion suppressive material comprises powdered limestone; and said method further comprises adding calcium hydroxide to the mixed powder.

22. The method according to claim 21 wherein said method comprises dispersing the mixed powder in a spray sorption system as a milk-of-lime suspension.

* * * * *

UNITED STATES PATENT AND TRADEMARK OFFICE
CERTIFICATE OF CORRECTION

PATENT NO. : 6,074,620
DATED : June 13, 2000
INVENTOR(S) : Ekkehard KIENOW, Bernd MORUN, Thomas SCHWERTMANN, and Heinz HOBERG It is certified that error appears in the above-identified patent and that said Letters Patent is hereby corrected as shown below:

In column 1, line 61, after 'inherently', delete "safes" and insert --safe,--.

In column 2, line 9, after 'calcium', delete "compounds" and insert --compound,--.

In column 2, line 12, after 'activated', delete "cokes" and insert --coke,--.

In column 3, line 44, after 'Bennett,' insert --which--.

In column 3, line 57, after 'granite', delete "slates" and insert --slate,--.

UNITED STATES PATENT AND TRADEMARK OFFICE
CERTIFICATE OF CORRECTION

PATENT NO.  : 6,074,620
DATED       : June 13, 2000
INVENTOR(S) : Ekkehard KIENOW, Bernd MORUN, Thomas SCHWERTMANN, and Heinz HOBERG It is certified that error appears in the above-identified patent and that said Letters Patent is hereby corrected as shown below:

In column 3, line 60, after 'present', delete "inventions" and insert --invention,--.

In column 4, line 6, after 'inert', delete "materials" and insert --material,--.

In column 8, line 17, after 'd'=30', delete "m," and insert --µm,--.

In column 8, line 23, after 'µm,', delete "n=096" and insert --n=0.96--.

In column 8, line 45, after 'present', delete "inventions" and insert --invention,--.

UNITED STATES PATENT AND TRADEMARK OFFICE
CERTIFICATE OF CORRECTION

PATENT NO. : 6,074,620
DATED : June 13, 2000
INVENTOR(S) : Ekkehard KIENOW, Bernd MORUN, Thomas SCHWERTMANN, and Heinz HOBERG It is certified that error appears in the above-identified patent and that said Letters Patent is hereby corrected as shown below:

In column 9, line 49, after 'present', delete "inventions" and insert --invention,--.

In column 9, line 55, after 'present', delete "inventions" and insert --invention,--.

In column 9, line 56, before 'can', delete "embodiments" and insert --embodiment,--.

In column 9, line 58, after 'household', delete "refuses" and insert --refuse,--.

In column 9, line 60, after 'present', delete "inventions" and insert --invention,--.

UNITED STATES PATENT AND TRADEMARK OFFICE
CERTIFICATE OF CORRECTION

PATENT NO. : 6,074,620
DATED : June 13, 2000
INVENTOR(S) : Ekkehard KIENOW, Bernd MORUN, Thomas SCHWERTMANN, and Heinz HOBERG It is certified that error appears in the above-identified patent and that said Letters Patent is hereby corrected as shown below:

In column 9, line 63, after 'waste.', delete "Furthers" and insert --Further,--.

In column 10, line 9, before 'lines', delete "examples" and insert --example,--.

In column 10, line 22, after 'inert', delete "materials" and insert --material,--.

In column 10, line 30, after 'particle', delete "diameters" and insert --diameter,--.

In column 16, line 1, Claim 18, after 'claim', delete "1," and insert --17,--.

Signed and Sealed this

Eighth Day of May, 2001

Attest:

NICHOLAS P. GODICI

Attesting Officer

Acting Director of the United States Patent and Trademark Office